M. C. OVERMAN.
SHOCK ABSORBER.
APPLICATION FILED SEPT. 26, 1912.
1,060,017.
Patented Apr. 29, 1913.
2 SHEETS—SHEET 1.
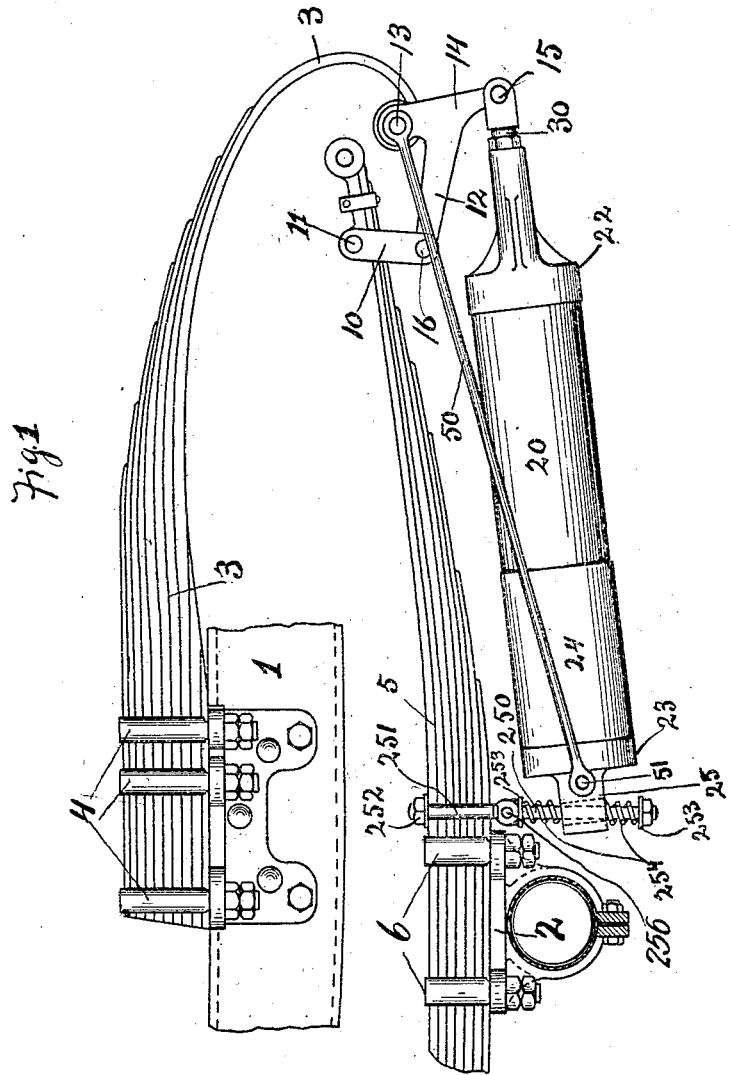

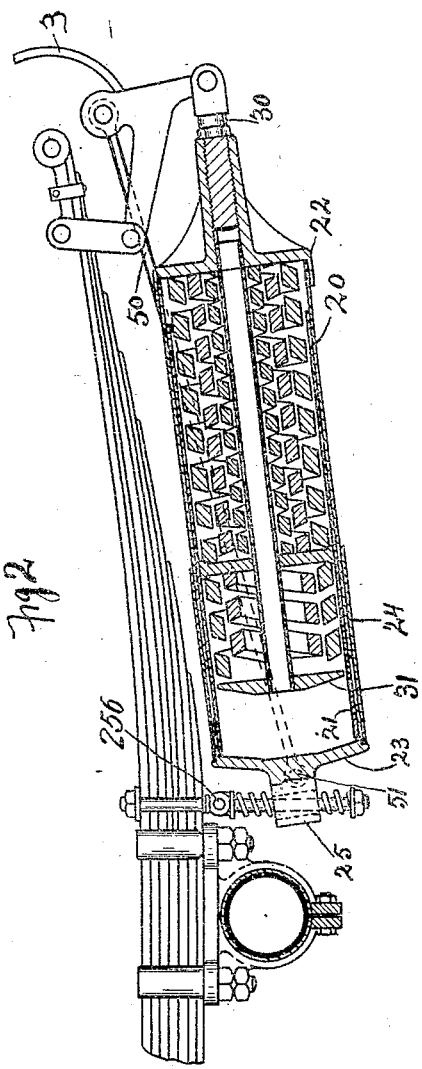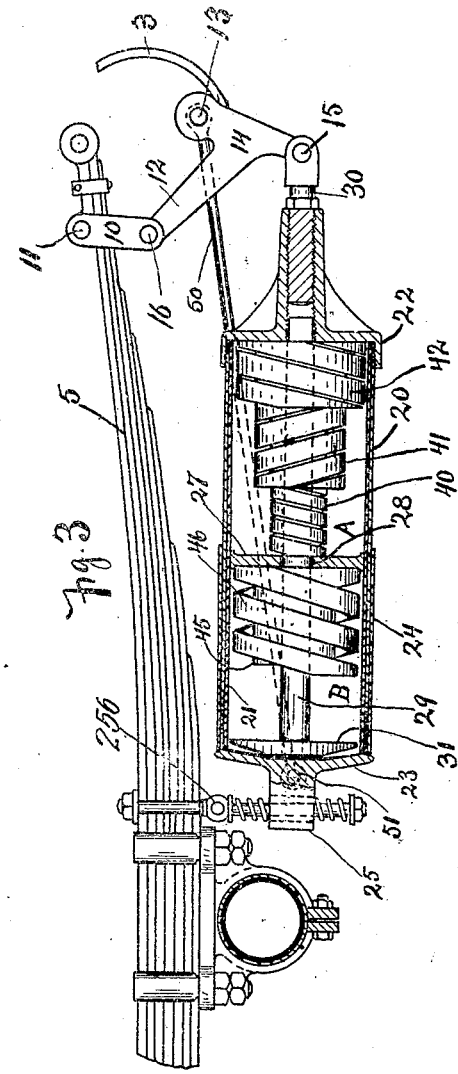

UNITED STATES PATENT OFFICE.

MAX CYRUS OVERMAN, OF NEW YORK, N. Y.

SHOCK-ABSORBER.

1,060,017.  Specification of Letters Patent.  Patented Apr. 29, 1913.

Application filed September 26, 1912. Serial No. 722,405.

*To all whom it may concern:*

Be it known that I, MAX CYRUS OVERMAN, a citizen of the United States, residing at New York, in the county of New York and State of New York, have invented certain new and useful Improvements in Shock-Absorbers, of which the following is a specification.

This invention relates to road vehicles and particularly to automobiles and to means adapted to lessen the shocks of riding over a rough surface, and its novelty consists in the construction and adaptation of parts as will be more fully hereinafter pointed out.

There are three usual ways of providing a vehicle and particularly an automobile vehicle with springs, namely—(1st) whole-elliptic in which a spring comprising a whole ellipse is interposed between the body of the vehicle and its running gear; (2d) half-elliptic in which the lower spring secured to the running gear is a half ellipse, and there is no spring on the body of the vehicle, but the latter is provided with a bracket or some other suitable means with which one end of the spring is connected; and (3d) three-quarters elliptic in which the lower spring secured to the running gear is in the form of a half-ellipse and the upper spring secured to the body of the vehicle is in the form of a quarter of an ellipse. In short, the main-spring means consists of a part on the body which may therefore conveniently be called a body part, and of another part on the running gear which in turn may be conveniently called a running gear part and these may consist of brackets and springs in various combinations. When a vehicle such as is referred to, rides over an obstacle or obstacles, the running gear is thrown upward toward the body and the shock is transmitted through the spring system referred to to the body, but on account of the elasticity of the springs its severity, duration and extent are diminished and comfortable riding ensues. It, however, happens where roads are so rough that numerous shocks of this kind take place, the vibrations of the spring system rapidly succeed each other to such an extent that the body of the vehicle acquires an unpleasant vibratory motion. It is to overcome these vibrations that shock absorbers are employed. It is obvious that shock absorbers of any kind must be interposed in the spring system between the spring of the running gear of the vehicle and the spring of the body of the vehicle, or some other portion of the body of the vehicle as may occur, or, in short, they must be interposed between the running gear parts and the body parts of the main-spring means.

I have discovered that one of the most efficient forms of shock absorbers comprises two mutually movable members, one adapted to telescope with the other and surrounding a nest or nests of springs so arranged that when the running gear and body of the vehicle are moved toward each other, as above stated, this motion is by suitable mechanism conveyed to one of these telescoping members, the other being relatively fixed with respect thereto and the shock is taken up by the resiliency of the spring system forming part thereof. Also by arranging such a shock absorber in horizontal position and substantially parallel with the members of the main springs, I find that longer resilient members may be employed than can otherwise be used, and that a corresponding efficiency of operation and delicacy of adjustment can be secured.

This device is efficient but under some conditions of use I have found that the various lines of energy have a tendency to counteract and balance each other. After much experiment I have discovered that this action can be prevented if the distance between the fulcrum of the lever and that member of the shock absorber with which it is not connected can be kept constant, and I provide means for that purpose by rigidly connecting the fulcrum pivot to the pivot of the second shock absorber member, and permitting to the latter a slight freedom of movement. This will be readily understood from the description which follows.

In the drawings, Figure 1 is a side elevation of the rear portion of a vehicle equipped with my improved device, and with a three-quarter elliptical spring, the upper and lower springs being in normal position; Fig. 2 is a side elevation of the lower spring and a central longitudinal section of the shock absorber, the parts being shown in the position which they assume when the upper and lower springs are in the same position as in Fig. 1; Fig. 3 is a view similar to Fig. 2 except that the running gear and the body have been forced toward each other, the tubular parts of the shock absorber being shown in perspective and the springs being broken away to show the parts underneath.

In the drawings, 1 designates the body or upper part of a vehicle and 2 the running gear or lower part thereof.

3 is the rear portion of the usual elliptical or quarter-elliptical upper rear spring made of superimposed leaves and secured in place by suitable straps 4.

5 is the rear portion of the usual elliptical lower rear spring made of superimposed leaves and secured in place by suitable straps 6.

As usually made, the upper and lower springs are secured together at one end and their opposite ends are free and are commonly united by a shackle plate. In the illustration, this shackle plate is shown as removed and is replaced by a link 10 secured to the lower spring by a pivot 11 and a lever 12 secured to the free end of the upper spring 3 by a pivot 13 on which it is fulcrumed. The lever 12 has an outwardly extending arm 14 which makes of it an elbow lever and this in turn is secured to one member of the shock absorber by a pivot 15. The other arm of the lever 12 is secured to the link 10 by a pivot 16.

The shock absorber as shown in Figs. 1, 2 and 3 comprises a pair of telescoping tubes 20 and 21 having closed heads 22 and 23 respectively, the latter being also provided with a cylindrical dust guard indicated at 24. The head 23 is provided with a rearwardly extending member 25 which is vertically apertured and adpated to fit loosely upon an arm 250 whose upper end is pivoted at 256 to swing freely in the plane of the drawing from a strap 251 secured upon the relatively rigid portion of the lower spring 5 by any suitable means as the nuts 252. There are two retaining disks 253 on the arm 250 and between them and the member 25 are compression springs 254. By this construction the arm 25 of the tube 21 has a slight freedom or play of movement vertically and yet the springs 254 always tend to restore it to normal position after any such movement. This strap 251 or any other suitable means of supporting the arm 25 might as well be placed on any other part of the running gear of the vehicle as on the rigid part of the lower spring, but it is placed as it is for convenience of attachment. Within the tube 21 is arranged a disk 27 which has a central aperture 28 to permit of the passage of a plunger 29 which is rigidly secured to or made integral with the head 22. As shown in the illustration, a rod 30 threaded into the head 22 is actually shown pivoted to the arm 14 and the plunger proper is also threaded into the head 22. But these are mere details of construction, the principle of operation being that the plunger and head shall move with the attached tube 20 from the movement of the arm 14. At its free end the plunger 29 is provided with a stop plate 31. The disk 27 divides the interior of the absorber into two compartments A and B. In the compartment A there is placed a nest of coiled springs 40, 41 and 42 relatively long and of varying degrees of elasticity. In the compartment B there is a nest of two springs 45 and 46 relatively short and stiff. The function of the springs in the compartment A is that when the arm 14 is oscillated under the relative movement of the upper and lower parts of the vehicle, they will take up and absorb the energy of such movement which is apt to be so quick as to amount to a shock and to do this in such a manner that the resilient action of the main spring will be retarded. The function of the springs in the compartment B is to serve as a check to the recoil of the springs in the compartment A and thus prevent oscillation.

When the device so far described is used and the body and running gear are moved toward each other, the relative movement of the lower spring 5 and upper spring 3 (or the bracket or arm fixed to the body of the vehicle when there is no upper spring) will cause the lever 12 to move on its fulcrum 13, which movement being confined by the link 10 is directed to the arm 14 and causes an inward movement of the plunger 29 of the shock absorber, the parts moving from the positions shown in Fig. 2 to that shown in Fig. 3.

50, 50 are two rods, one on each side of the shock absorber, each secured to the fulcrum pivot 13 at one end and at the other end to a pivot 51 in the member 25.

The result of my improvement is that the shock absorber is supported most conveniently at one end from the running gear and at the other end from the body, and yet its horizontally movable support from the running gear, and the fact that its second member is tied to the lever-fulcrum end of the main-spring body part, prevent longitudinal displacements of the running gear and the body relative to each other when the vehicle is in motion from substantially operating the absorber parts to set up vibrations therein which dampen or choke the real intended work of the absorber which is to handle resiliently the vertical shocks and vibrations that occur between the running gear and the body.

What I claim is:

1. The combination in a vehicle of mainspring means comprising a running-gear part and a body-part, a lever fulcrumed to the body-part and connected with the running-gear part to be operated by the relative vertical motion of said parts, a horizontally disposed shock absorber comprising two relatively movable members, one of which is operatively connected to the lever, means which supports the second absorber-member from the running-gear so as to be free to move horizontally independent thereof, and means which maintains substantially constant the distance between the second absorber-member and the fulcrum end of the main-spring body part.

2. The combination in a vehicle of main-spring means comprising a running-gear part and a body-part, a lever fulcrumed to the body-part and connected with the running-gear part to be operated by the relative vertical motion of said parts, a shock absorber disposed horizontally lengthwise of the main-spring running-gear part and comprising two relatively movable members, one of which is operatively connected to the lever, means which supports the second absorber-member from the running-gear so as to be free to move horizontally lengthwise of the main-spring running-gear part, and means which maintains substantially constant the distance between the second absorber-member and the fulcrum end of the main-spring body part.

3. The combination in a vehicle of main-spring means comprising a running-gear part and a body-part, a lever fulcrumed to the body part and connected with the running-gear part to be operated by the relative vertical motion of said parts, a horizontally disposed shock absorber comprising two relatively movable members, one of which is operatively connected to the lever, means which supports the second absorber-member from the running gear so as to be free to move horizontally independent thereof, and to have vertical play relative thereto, and means which maintains substantially constant the distance between the second absorber-member and the fulcrum end of the main-spring body part.

4. The combination in a vehicle of main-spring means comprising a running-gear part and a body-part, a lever fulcrumed to the body part and connected with the running-gear part to be operated by the relative vertical motion of said parts, a horizontally disposed shock absorber comprising two relatively movable members, one of which is operatively connected to the lever, means pivoted to the running gear and on which the second absorber-member has yielding vertical play, and means which maintains substantially constant the distance between the second absorber-member and the fulcrum end of the main-spring body part.

5. The combination in a vehicle of main-spring means comprising a running-gear part and a body-part, a lever fulcrumed to the body part and connected with the running-gear part to be operated by the relative vertical motion of said parts, a horizontally disposed shock absorber comprising two relatively movable members, one of which is operatively connected to the lever, means which supports the second absorber-member freely from the running gear, and means which unites together the second absorber-member and the main-spring body part so that the first absorber-member can work against the second.

6. The combination in a vehicle of main-spring means comprising a running-gear part and a body-part, a horizontally disposed shock-absorber comprising two relatively movable resiliently related members; connecting means between the aforesaid parts of the main-spring which converts their relative vertical motion into a horizontal motion, said means comprising a lever fulcrumed to one of the main-spring parts and connected with one of the shock-absorber parts; and means which maintains substantially constant the distance between the second shock-absorber member and the fulcrum portion of the aforesaid main-spring part.

In testimony whereof I affix my signature in presence of two witnesses.

MAX CYRUS OVERMAN.

Witnesses:
 WILLIAM R. BAIRD,
 EDGEWORTH GREENE.